US008005291B2

(12) United States Patent
Joo et al.

(10) Patent No.: US 8,005,291 B2
(45) Date of Patent: Aug. 23, 2011

(54) INSPECTING METHOD BY USING MARK PARTITIONING

(75) Inventors: Hyonam Joo, Cheonan-si (KR); Jung Seob Lee, Seoul (KR); Keun Ho Rew, Cheonan-si (KR)

(73) Assignee: Hoseo University Academic Cooperation Foundation (KR)

( * ) Notice: Subject to any disclaimer, the term of this patent is extended or adjusted under 35 U.S.C. 154(b) by 470 days.

(21) Appl. No.: 12/291,777

(22) Filed: Nov. 13, 2008

(65) Prior Publication Data

US 2009/0245620 A1 Oct. 1, 2009

(30) Foreign Application Priority Data

Mar. 26, 2008 (KR) .......................... 10-2008-0027802

(51) Int. Cl.
*G06K 9/00* (2006.01)
(52) U.S. Cl. ....................................................... 382/141
(58) Field of Classification Search ........... 382/141–146
See application file for complete search history.

(56) References Cited

U.S. PATENT DOCUMENTS 5,568,564 A * 10/1996 Ozaki ........................... 382/149
7,558,419 B1 * 7/2009 Ye et al. ........................ 382/144
2001/0053245 A1 * 12/2001 Sakai et al. ................... 382/151

* cited by examiner

*Primary Examiner* — Michael P Stafira
(74) *Attorney, Agent, or Firm* — Ober, Kaler, Grimes & Shriver; Royal W. Craig (57) ABSTRACT

The present invention relates to a mark partitioning inspection method. A reference image and an inspection image are respectively acquired, and a correlation in a character unit for the reference image and the inspection image is obtained, and then the correlation value is compared with a first threshold value that has been previously set. Then, when the correlation value is greater than the first threshold value, the relevant character is partitioned into a predetermined number of regions, and a correlation between the reference image and the inspection image is obtained for each of the partitioned regions, and then a difference between the maximum and minimum values of the correlation is compared with a second threshold value that has been previously set. Here, even if a low defectiveness is revealed, the mark partitioning inspection method is capable of precisely determining whether or not it is defective, by determining the inspection image to be defective if the difference between the maximum and minimum values of the correlation is greater than the second threshold value, and by determining the inspection image to be normal when the difference between the maximum and minimum values of the correlation is smaller than the second threshold value.

18 Claims, 12 Drawing Sheets

FIG. 1

(a) REFERENCE IMAGE  (b) NORMAL IMAGE (C) IMAGE INDICATING AN ILLUMINATION NON-UNIFORMITY

FIG. 2

Blur2 + ILLUMINATION NON-UNIFORMITY(MAX10)   Blur3 + ILLUMINATION NON-UNIFORMITY (MAX20)

CUT-DEFECTIVE IMAGE    NORMAL IMAGE

(a) SCRATCH-DEFECTIVE IMAGE (b) NORMAL IMAGE

BROKEN-DEFECTIVE IMAGE    NORMAL IMAGE

(a) CUT-DEFECTIVE DISTRIBUTION DIAGRAM

FIG. 14a (b) SCRATCH-DEFECTIVE DISTRIBUTION DIAGRAM

| | | BROKEN(RESULT OF THE EXISTING METHOD) | BROKEN(RESULT OF THE PROPOSED METHOD) | | | |
|---|---|---|---|---|---|---|
| TEST IMAGE | B | 0.977619 | 0.999048 | 0.998857 | 0.999047 | 0.940827 |
| | 1 | 0.977346 | 0.999412 | 0.999456 | 0.977636 | 0.932020 |
| | P | 0.978567 | 0.999280 | 0.948220 | 0.993780 | 0.998971 |
| | D | 0.965522 | 0.999452 | 0.999383 | 0.959918 | 0.999362 |
| | E | 0.974849 | 0.999317 | 0.999062 | 0.922700 | 0.985522 |
| | 5 | 0.973992 | 0.998800 | 0.910240 | 0.998755 | 0.999050 |
| | C | 0.976427 | 0.932649 | 0.997181 | 0.998672 | 0.998780 |
| | 8 | 0.979166 | 0.999411 | 0.999331 | 0.928667 | 0.982188 |

| | | CUT(RESULT OF THE EXISTING METHOD) | CUT(RESULT OF THE PROPOSED METHOD) | | | |
|---|---|---|---|---|---|---|
| TEST IMAGE | B | 0.984192 | 0.946807 | 0.998000 | 0.998917 | 0.999038 |
| | 1 | 0.982002 | 0.939541 | 0.999456 | 0.997710 | 0.999488 |
| | P | 0.987364 | 0.999363 | 0.999438 | 0.952883 | 0.998926 |
| | D | 0.972634 | 0.945760 | 0.989583 | 0.999416 | 0.999451 |
| | E | 0.982914 | 0.999386 | 0.963326 | 0.998556 | 0.956135 |
| | 5 | 0.973283 | 0.999403 | 0.999263 | 0.881557 | 0.978868 |
| | C | 0.968672 | 0.999484 | 0.841938 | 0.999223 | 0.999049 |
| | 8 | 0.972272 | 0.983062 | 0.995470 | 0.909178 | 0.988929 |

| | | SCRATCH(RESULT OF THE EXISTING METHOD) | SCRATCH(RESULT OF THE PROPOSED METHOD) | | | |
|---|---|---|---|---|---|---|
| TEST IMAGE | B | 0.970526 | 0.999414 | 0.999454 | 0.951168 | 0.944151 |
| | 1 | 0.977133 | 0.999373 | 0.999503 | 0.994508 | 0.929099 |
| | P | 0.961842 | 0.999469 | 0.956253 | 0.983701 | 0.991067 |
| | D | 0.979272 | 0.991485 | 0.999392 | 0.976104 | 0.965305 |
| | E | 0.977996 | 0.980671 | 0.999092 | 0.948006 | 0.999168 |
| | 5 | 0.977358 | 0.963165 | 0.971980 | 0.999737 | 0.999218 |
| | C | 0.980799 | 0.972432 | 0.980526 | 0.999223 | 0.999049 |
| | 8 | 0.973523 | 0.964980 | 0.966554 | 0.975785 | 0.999364 |

FIG. 17

INSPECTING METHOD BY USING MARK PARTITIONING

CROSS-REFERENCE TO RELATED APPLICATIONS

The present application derives priority from Patent Application 10-2008-0027802 filed in the Republic of Korea on Mar. 26, 2008 which is incorporated herein by reference.

BACKGROUND OF THE INVENTION

1. Field of the Invention

The present invention relates to a method for inspecting on exterior of a semiconductor package, and more particularly, to a mark partitioning inspection method.

2. Description of the Background

The machine vision technology that has been developed in recent years is an important technology in automatic semiconductor package inspection. In the semiconductor package automatic inspection, the inspection items may be classified into two categories: electrical characteristic and function inspection; and exterior inspection, where the exterior inspection inspects whether semiconductor packages have any lead frame or mark defects.

In the exterior inspection, locations, directions, distortions, scratches, omissions, and breaks of various marks indicating semiconductor package information, such as product name and manufacturer name are inspected.

As semiconductor packages are gradually becoming smaller, lots of time and cost are required to process such inspection items using visual inspection, and distribution of defective products by misjudgment results in cost increase. Accordingly, high-performance inspection technologies have been recently developed in and applied to a field of semiconductor mark inspection.

Mark inspection algorithm largely includes image acquisition, image processing, feature extraction, object recognition and classification, and studies on method of effectively inspecting whether a mark is defective have been developed on the basis of character recognition, such as optical character recognition (OCR) and optical character verification (OCV).

For mark inspection of a semiconductor package, it should be considered to shorten inspection time through a simple and high-reliable algorithm. Furthermore, an OCV algorithm, in which certain characters to be inspected are known in advance and only the known characters are inspected, is more appropriate than an algorithm of OCR in which a lot of data are required for character recognition.

In OCV, defective marks are generally inspected using correlation coefficient, and location defect of marks is inspected through location data thereof.

Meanwhile, though strict inspection technology is required to find defects of a mark since such defects may exist in various types and locations, quite a few problems become known when defective marks are inspected using OCV.

Defective marks are typically generated by scratch error or mark printing error that has been made on the marks, and may come in various types, i.e., an edge portion of the mark being cut off, or a middle portion of mark being broken.

For a mark having a low level of defectiveness, there is a problem in that it is difficult to determine whether there is a defect on the mark using a normalized correlation coefficient method such that the defect cannot be detected.

SUMMARY OF THE INVENTION

An object of the present invention is to provide a mark partitioning inspection method capable of precisely detecting its defectiveness even if the defectiveness is of low level.

In one general aspect, a mark partitioning inspection method according to the present invention, which has been devised to solve the foregoing problem, includes: acquiring a reference image which is a reference for determining whether or not a mark has a defect; acquiring an inspection image for determining whether or not a mark has a defect; obtaining a correlation in a character unit for the reference image and the inspection image, and then comparing a correlation value with a first threshold value that has been previously set; partitioning the relevant character into a predetermined number of regions if the correlation value is greater than the first threshold value; and obtaining a correlation between the reference image and the inspection image for each of the partitioned regions, and then comparing a difference between maximum and minimum values of the correlation with a second threshold value that has been previously set to determine whether or not the inspection image is defective.

Implementations of this aspect may include one or more of the following features.

The method may further include determining that the inspection image is defective if the correlation value is smaller than the first threshold value. The step of partitioning the relevant character into a predetermined number of regions may include partitioning of the relevant character into four regions.

The step of comparing a difference between the maximum and minimum values of the correlation with a second threshold value to determine whether or not the inspection image is defective may include determining that the inspection image is defective if the difference between the maximum and minimum values of the correlation is greater than the second threshold value.

The step of comparing a difference between the maximum and minimum values of the correlation with a second threshold value to determine whether or not the inspection image is defective may include determining that the inspection image is normal if the difference between the maximum and minimum values of the correlation is smaller than the second threshold value.

According to the present invention, a low level of defects on a mark such as breaks, cuts and scratches can be accurately detected to reduce an undetectable rate of defective mark.

DETAILED DESCRIPTION OF THE PREFERRED EMBODIMENTS

Hereinafter, a mark partitioning inspection method of the present inventive disclosure will be described in detail with reference to FIGS. 1 through 17.

In describing the present invention, when it is judged that a specific description on the known prior technology related to the present invention might unnecessarily blur the gist of the present invention, the detailed description thereto will be omitted. In addition, terminologies to be described later are the ones defined in consideration of functions of the present invention and may vary according to the usual practice or intention of a user or an operator. Accordingly, the definitions of the terminologies should be defined on the basis of the disclosures described throughout the specification.

Figure 1:
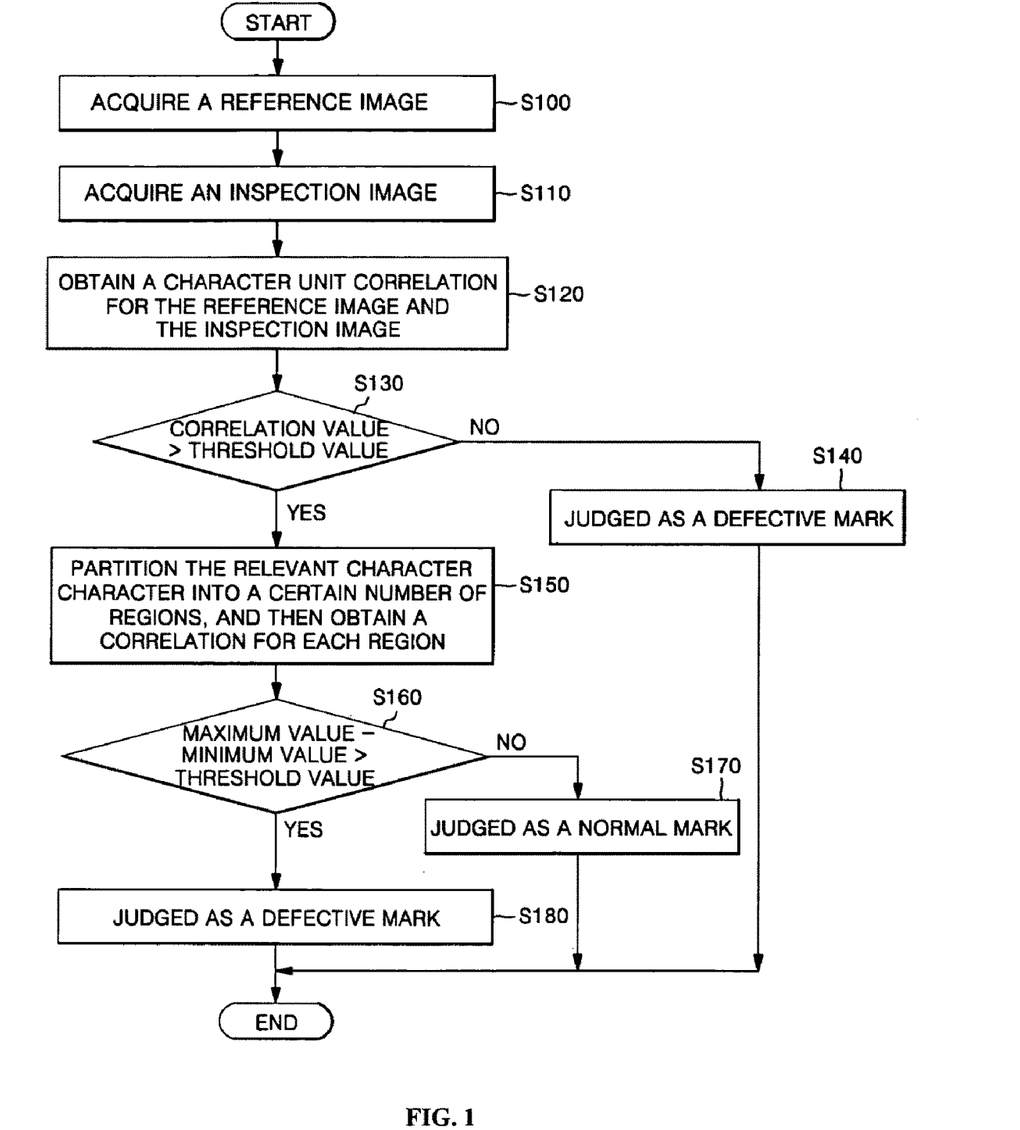
FIG. 1 is a flow chart illustrating a mark partitioning inspection method according to the present invention.

FIG. 1 is a flow chart illustrating a mark partitioning inspection method according to the present invention.

Referring to FIG. 1, a reference image is first acquired, which is a reference for determining whether or not a mark is defective (S 100). That is, a mark image of a product sample is taken using a camera or the like, and then stored in a memory.

Then, a mark image of an actual product is taken to acquire an inspection image (S 110). At this time, a mark of a semiconductor package is read as a character image using a reading device such as a charge coupled device (CCD) or a scanner.

Subsequently, a correlation for the reference image and the inspection image is obtained for each character (S 120).

In other words, a correlation between the reference image and the inspection image is analyzed to determine whether or not the mark is defective. At this time, comparing the reference image with the inspection image is made per character unit.

That is, a blob analysis operation for separating individual characters from the reference image is performed. In image processing, a blob analysis comprises the identification of related foreground pixels as part of the same "blob" or image element. In the present method, the image characteristic of each character data is extracted, and then a character having an image characteristic similar thereto is found within the inspection image. Furthermore, a correlation between a character of the reference image and a character of the inspection image is obtained.

For example, when a character called 'A' exists in the reference image, the character is separated, and then the image characteristic of that character such as dispersion and average of pixel values, is extracted.

Furthermore, a character having an image characteristic similar to the image characteristic of the character is detected from the inspection image, and then a correlation between 'A' region data of the reference image and 'A' region data of the inspection image is obtained using a correlation coefficient program. Here, the correlation may be shown in a normalized correlation coefficient (NCC).

Then, a correlation value between a character of the reference image and a character of the inspection image is compared with a threshold value that has been previously set (S 130).

As a result of the comparison in the step S130, if the correlation value between a character of the reference image and a character of the inspection image is smaller than a threshold value that has been previously set, the mark on the product sample is determined as a defective mark (S 140).

As a result of the comparison in the step S130, if the correlation value between a character of the reference image and a character of the inspection image is greater than a threshold value that has been previously set, then the character of the reference image and the character of the inspection image may be partitioned into a predetermined number of regions, and then a correlation is obtained again for each region (S 150).

In the step of S 130, it is difficult to determine that all masks are normal even if a correlation value between a character of the reference image and a character of the inspection image is greater than a threshold value that has been previously set.

That is, based on the result of comparison in a character unit alone, the problem is that it is difficult to distinguish a normal mark from a defective mark (the detailed explanation will be described later), and therefore each character data is partitioned into each region for clear distinction, and then a process for comparing the correlations is performed again.

For example, a region of a character called 'A' is partitioned into four in the reference image and the inspection image, and a value of normalized correlation coefficient (NCC) is obtained from each region.

Although the defectiveness of a mark may be more precisely inspected as the number of partitioned regions increases, it has a disadvantage that the inspection time is lengthened. Accordingly, it is preferred that a region of each character data be partitioned into four.

Next, a difference between the maximum and minimum values of the correlation in a partitioned region is compared with a threshold value that has been previously set (S 160).

As a result of the comparison in the step S160, if the difference between the maximum and minimum values of the correlation in a partitioned region is smaller than a threshold value that has been previously set, the mark on the product sample is determined as a normal mark (S 170).

In addition, as a result of the comparison in the step S160, if the difference between the maximum and minimum values of the correlation in a partitioned region is greater than a threshold value that has been previously set, the mark on the product sample is determined as a defective mark (S 180).

According to the present invention, the defectiveness or non-defectiveness may be precisely determined for a defective mark that has not been detected as a defective mark by performing the existing character unit inspection, thereby greatly enhancing the non-detection rate of a defective mark.

Hereinafter, data and results of experiments that use a mark partitioning inspection method according to the present invention will be examined.

Figure 2:
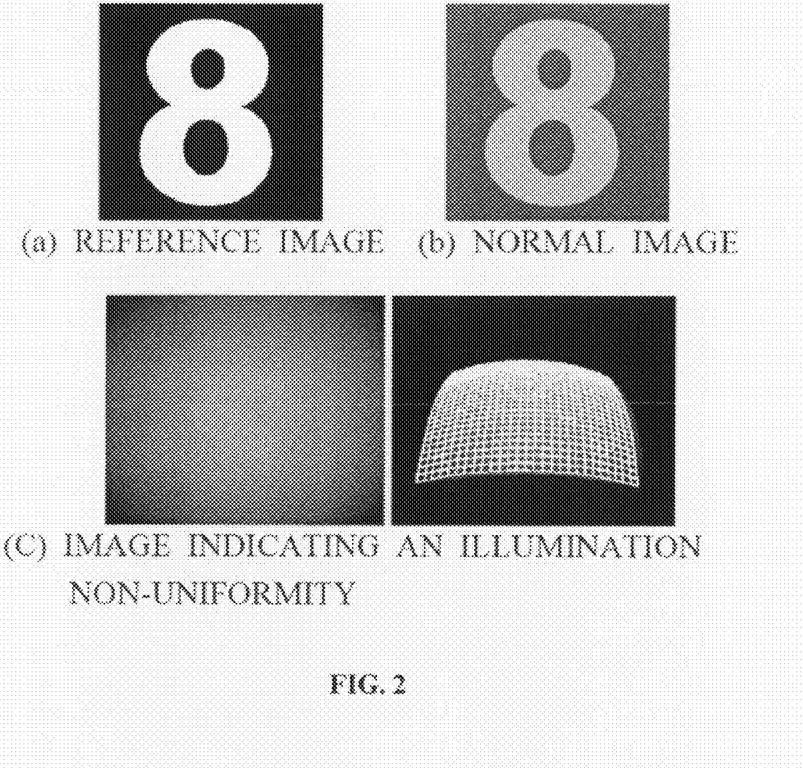
FIG. 2 is a view illustrating a reference image, a normal image, a non-uniform image for generating illumination non-uniformity.

In this experiment, the signal to noise ratio (SNR) of Gaussian noise is varied from 10 to 30 to find out what is changed with noise. For a noise adding method, the SNR was increased one by one from 10 to 30, and noises were applied 30 times to an image for each SNR. FIG. 2 is a view illustrating a reference image, a normal image, a non-uniform image for generating illumination non-uniformity, which are used in this experiment.

Figure 3:
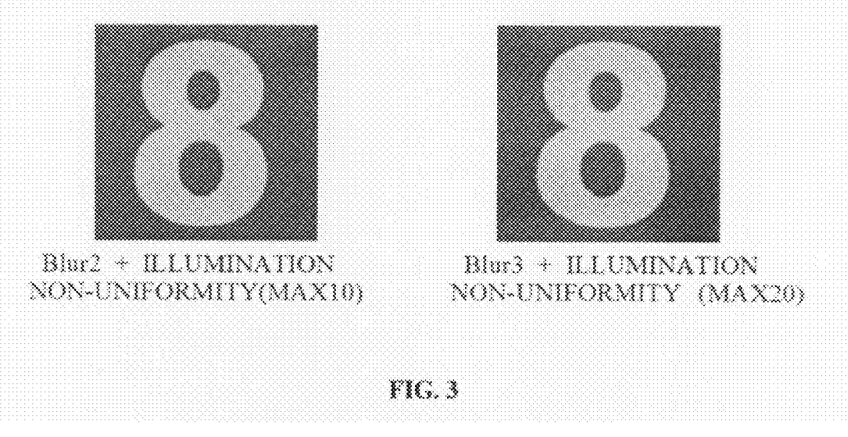
FIG. 3 is a view in which blur effect and illumination non-uniformity are applied to a normal image.

First, a drawback to the existing mark inspection method will be examined through the experiment data. FIG. 3 is a view in which blur effect and illumination non-uniformity are applied to a normal image. In other words, in order to emphasize reality, an average filter having a size of 3×3 was applied 2-3 times to create a blur effect, and along with this an image having an illumination non-uniformity of at most 10 and 20 was used, respectively.

Figure 4:
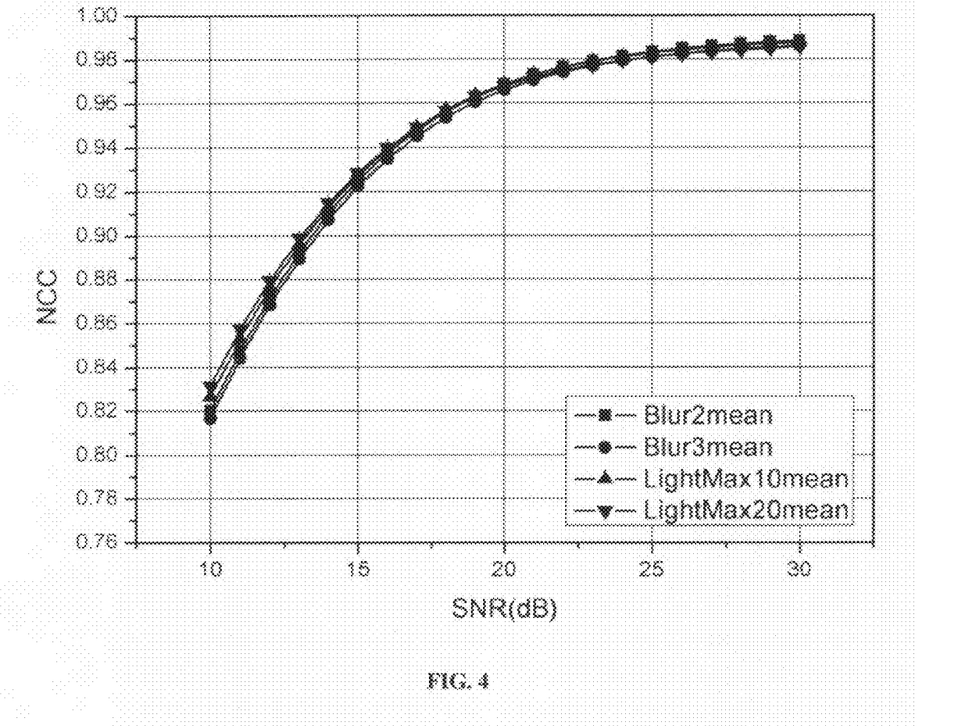
FIG. 4 is a graph illustrating a correlation coefficient distribution of normal images according to the conventional mark inspection method.

FIG. 4 is a graph illustrating a correlation coefficient distribution of normal images according to an existing mark inspection method. Here, LightMax10 and LightMax20 represent correlation coefficient distributions which are added by an illumination non-uniformity having up to 10 and 20, respectively.

As illustrated herewith, if an experiment result of a normal image is studied, it can be seen that a value of the correlation coefficient is in the range of 0.98-0.99 at SNR 30, where the noise is the least.

Furthermore, it is shown that there is no difference between an image added by illumination non-uniformity and an image with no such effect, and therefore it can be seen that illumination non-uniformity is not worth consideration when inspected for a narrow region of a character.

Subsequently, a drawback to the existing mark inspection method will be examined by comparing an inspection result of the existing mark inspection method for the normal image with an inspection result of the existing mark inspection method for the defective image.

Figure 5:
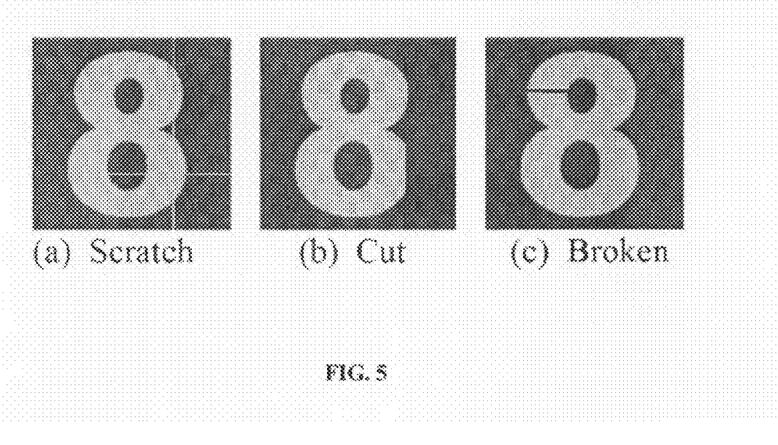
FIG. 5 is a view illustrating defective images with scratch, cut, and broken.

As illustrated in FIG. 5, images having scratched, cut, and/or broken portions are used as defective images.

Figure 6:
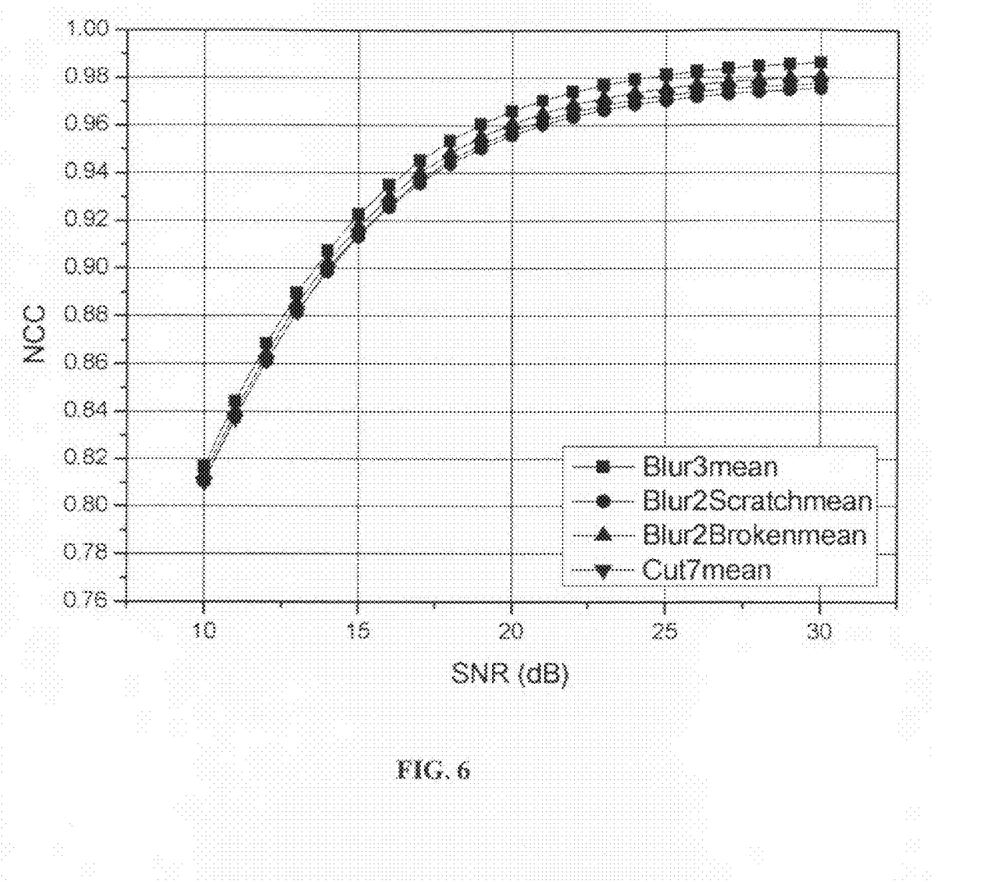
FIG. 6 is a graph illustrating a correlation coefficient distribution of defective images according to the conventional mark inspection method.

FIG. 6 is a graph illustrating a correlation coefficient distribution of defective images according to an existing mark inspection method. Here, Blur3, Blur2Scratch, Blur2Broken, and Cut7 represent normal, scratched, broken, and cut images, respectively.

Referring to FIG. 6, it can be seen that the inspection result of a normal image is very similar to that of a defective image, which is a drawback to the existing mark inspection method. In other words, it is difficult to distinguish a normal image from a defective image.

If SNR is 20, values of the normalized correlation coefficient (NCC) for each image are shown in Table 1.

TABLE 1

|  | Blur3 | Blur2_Scratch | Blur2_Broken | Cut7 |
|---|---|---|---|---|
| NCC | 0.96613 | 0.95604 | 0.96073 | 0.95771 |

In data of Table 1, when comparing a normalized correlation coefficient value of Blur3, which is a normal image, with normalized correlation coefficient values of other defective images, it can be seen that the highest difference is 0.01009. However, it is very difficult to determine whether it is normal or defective through a manual operation by an operator.

Accordingly, the present invention using the character partitioning method has proposed a method capable of inspecting defectiveness of an image having a low defectiveness, and the experiment results of the mark partitioning inspection method according to the present invention will now be examined for each defective image.

Figure 7:
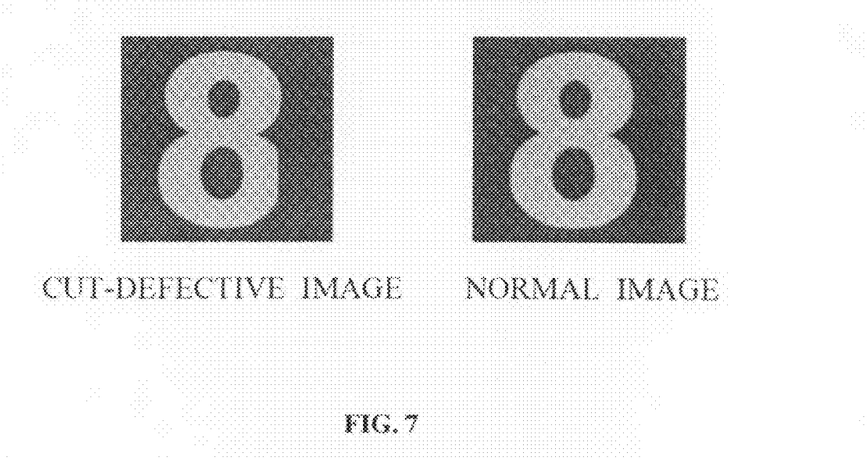
FIG. 7 is a view illustrating a cut-defective image and a normal image, which are used in an experiment according to the present invention.

(1) Partially-Cut Defective Image:

FIG. 7 is a view illustrating a cut-defective image and a normal image, which are used in this experiment. Here, the cut-defective image is a defective image where the cut portion has a thickness of 7 pixels.

First, a result of the cut-defective image inspected by an existing mark inspection method is analyzed. As a result of the experiment, a difference between a normal image and a cut-defective image was 0.00842 at SNR 20. In this case, the probability of non-detection for erroneously determining a cut-defective image as a normal image is high.

Figure 8:
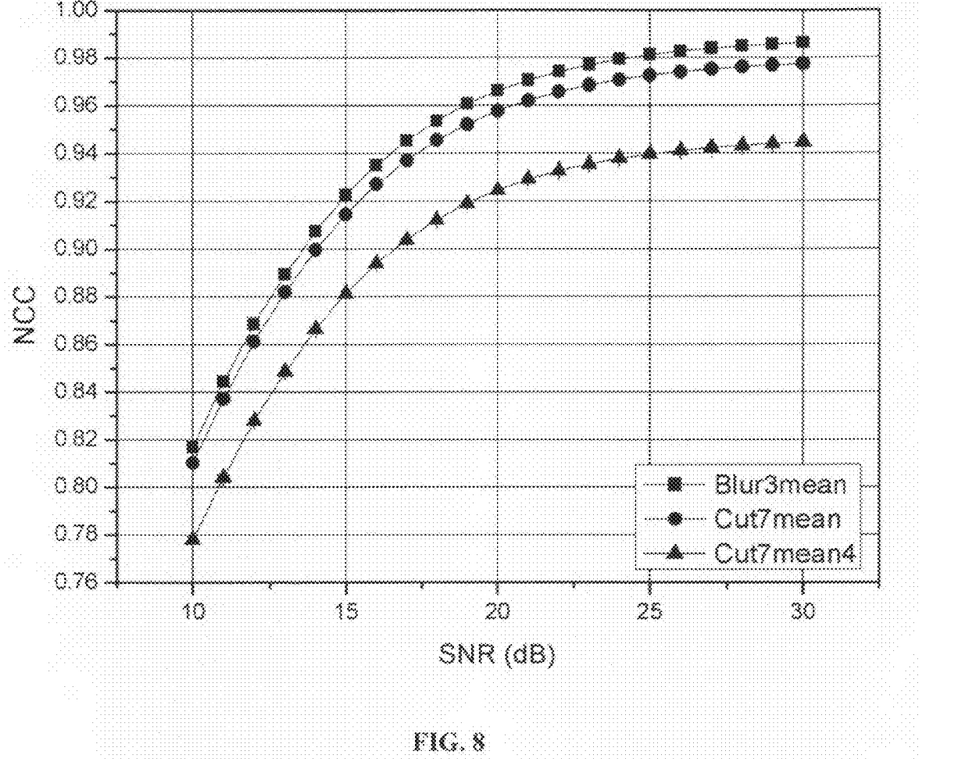
FIG. 8 is a graph illustrating an inspection result of a cut-defective image.

Next, the cut-defective image is inspected by a mark partitioning inspection method according to the present invention, and the inspection result is illustrated in FIG. 8. Here, rectangular Blur3 represents a correlation distribution for a normal image, circular Cut7 represents a correlation distribution for a defective image according to an existing method, and triangular Cut7 represents a correlation distribution for a defective image according to the invention.

Referring to FIG. 8, a difference in the NCC value between a normal image and a cut-defective image is 0.04159 at SNR 20, and therefore it was confirmed that it is 5 times higher than that of an existing method.

The result is shown in Table 2, and through the result data, according to an exterior inspection method of the invention, it can be seen that a difference in the correlation coefficient value between a normal image and a defective image has definitely increased, and through this it is possible to reduce the non-detection rate of a defective image.

TABLE 2

| SNR | Image | NCC | Standard Deviation |
|---|---|---|---|
| 20.0 | (Normal) Blur3 | 0.966130 | 0.000089 |
|  | (Prior art) Cut7 | 0.957710 | 0.000098 |
|  | (This invention) Cut7 | 0.924540 | 0.000271 |

Figure 9:
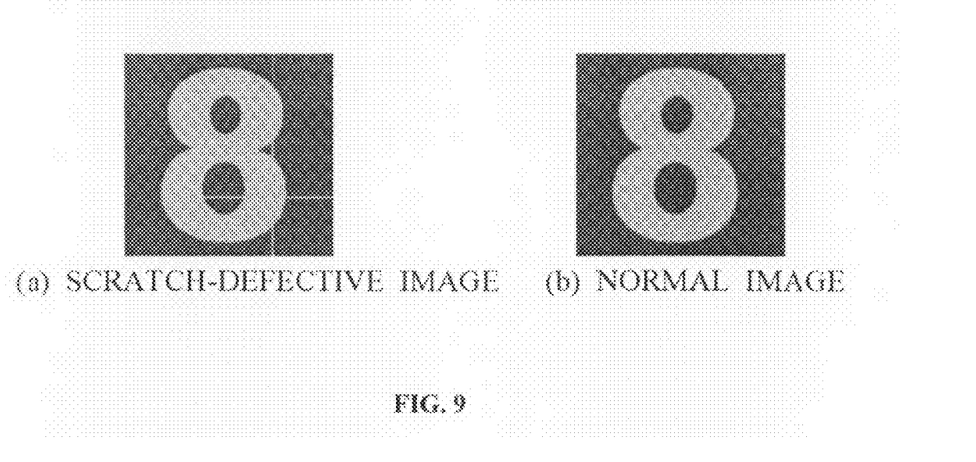
FIG. 9 is a view illustrating a scratch-defective image and a normal image, which are used in an experiment according to the present invention.

(2) Surface-Scratched Defective Image:

FIG. 9 is a view illustrating a scratch-defective image and a normal image, which are used in this experiment. Here, the scratch-defective image is a defective image in such a type that laterally includes a scratch having a thickness of two pixels, and longitudinally a scratch having a thickness of two pixels and a scratch having a thickness of one pixel are mixed half and half.

Figure 10:
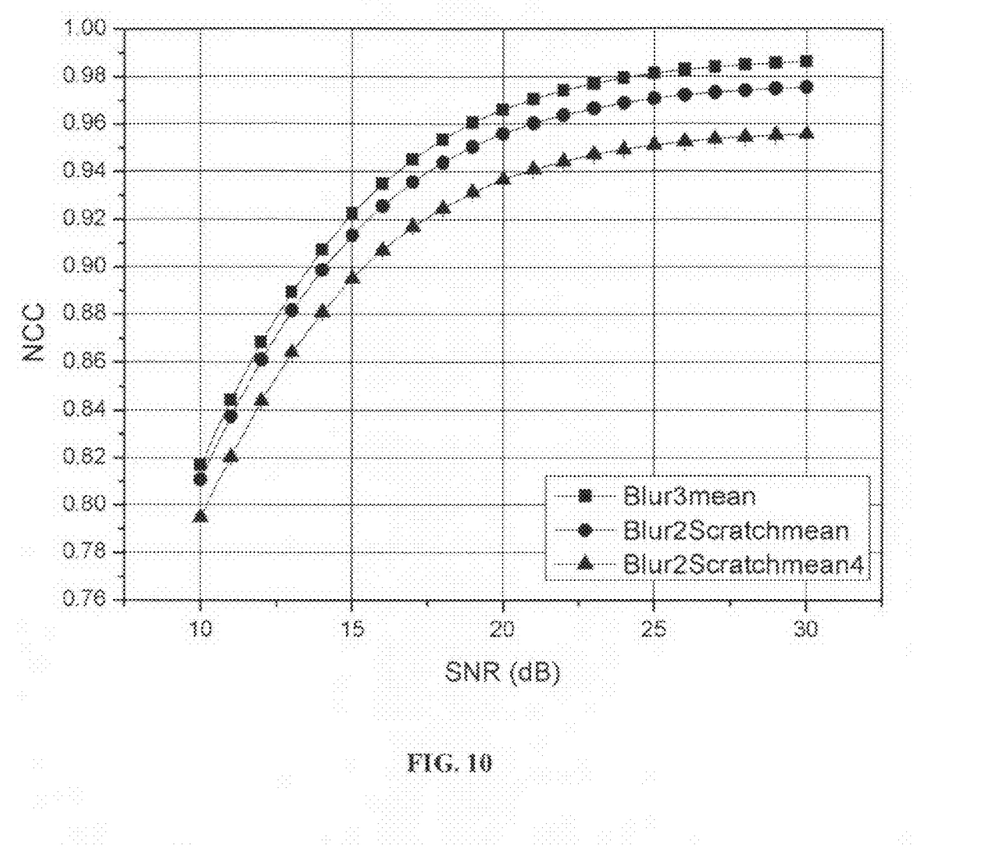
FIG. 10 is a graph illustrating an inspection result of a scratch-defective image.

FIG. 10 is a graph illustrating an inspection result of a scratch-defective image. Here, rectangular Blur3 represents a correlation distribution for a normal image, circular Blur2Scratch represents a correlation distribution for a defective image according to an existing method, and triangular Blur2Scratch represents a correlation distribution for a defective image according to the invention.

Referring to FIG. 10, it can be seen that a value in the NCC value is larger compared to that of an existing method, and the result is shown in Table 3.

TABLE 3

| SNR | Image | NCC | Standard Deviation |
| --- | --- | --- | --- |
| 20.0 | (Normal) Blur3 | 0.96613 | 0.000089 |
| | (Prior art) Scratch | 0.95604 | 0.000124 |
| | (This invention) Scratch | 0.93682 | 0.000272 |

In view of Table 3, it is shown that a difference in the NCC value between a scratch-defective image and a normal image using an existing method is 0.01009, and a difference in the NCC value between a scratch-defective image and a normal image using this invention is 0.02931, increased by about 3 times compared to that of an existing method.

Figure 11:
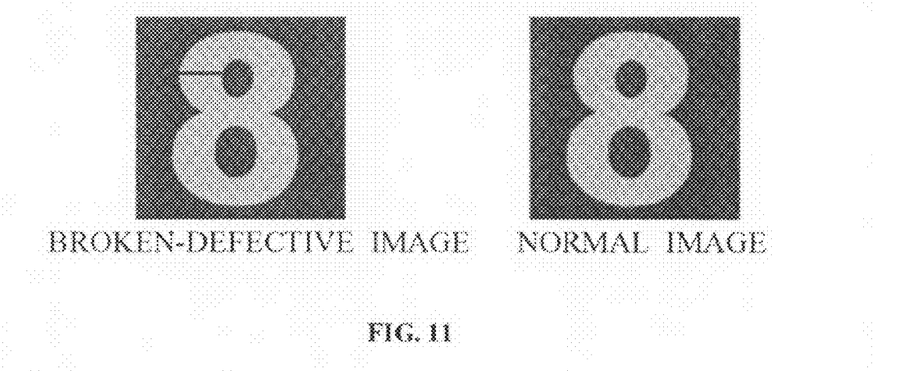
FIG. 11 is a view illustrating a broken-defective image and a normal image, which are used in an experiment according to the present invention.

(3) Defective Image where a Middle Portion of Character is Broken:

FIG. 11 is a view illustrating a broken-defective image and a normal image, which are used in this experiment. The broken-defective image, which is created with a shape where a middle portion of character is broken, is mainly generated by a printing error while creating a mark, and it is shown in the brightness similar to that of the background color.

Figure 12:
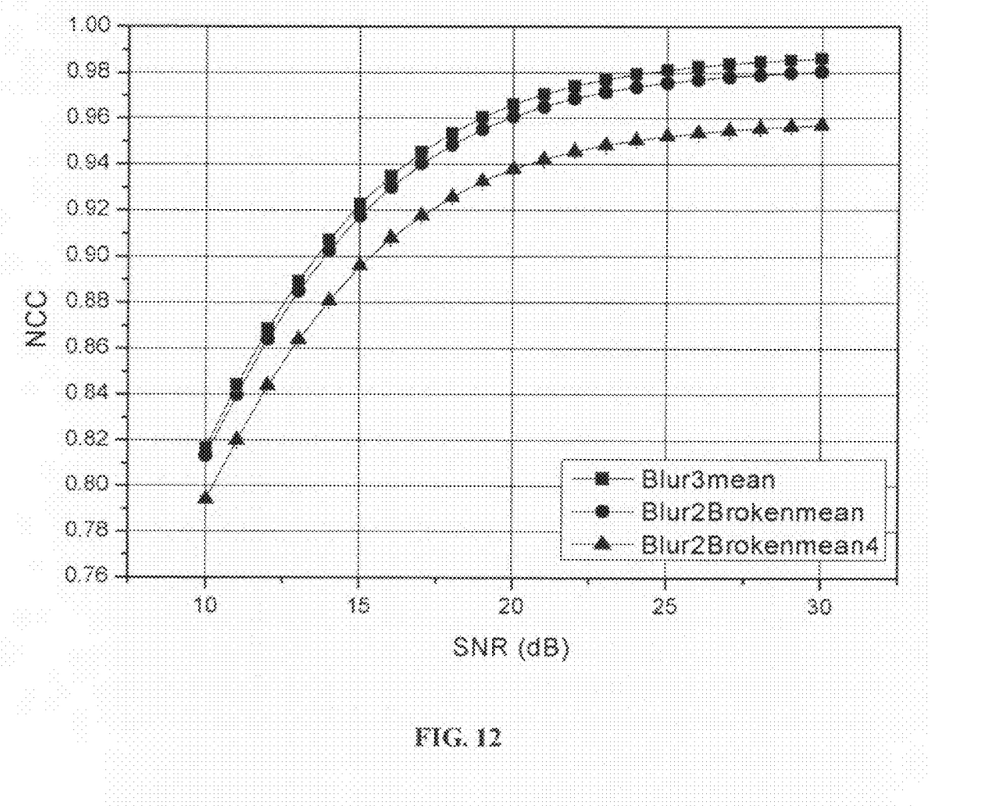
FIG. 12 is a graph illustrating an inspection result of a broken-defective image.

FIG. 12 is a graph illustrating an inspection result of a broken-defective image. Here, rectangular Blur3 represents a correlation distribution for a normal image, circular Blur2Broken represents a correlation distribution for a defective image according to an existing method, and triangular Blur2Broken represents a correlation distribution for a defective image according to the invention. In addition, the result is shown in Table 4.

TABLE 4

| SNR | Image | NCC | Standard Deviation |
| --- | --- | --- | --- |
| 20.0 | (Normal) Blur3 | 0.966130 | 0.000089 |
| | (Prior art) Broken | 0.960730 | 0.000092 |
| | (This invention) Broken | 0.937950 | 0.000211 |

In view of Table 3, it can be seen that a difference in the NCC value between a broken-defective image and a normal image using an existing method is 0.0054, and a difference in the NCC value between a broken-defective image and a normal image using this invention is 0.02818, increased by about 5 times compared to that of an existing method.

(4) Distribution Analysis by Varying the Defective Position and Defective Thickness of a Character:

In this experiment, test is conducted on how such a correlation distribution is shown according to the defective location and defective thickness variation in a partially-cut character (cut-defective), surface-scratched defective character (scratch-defective), and broken character (broken-defective).

Figure 13:
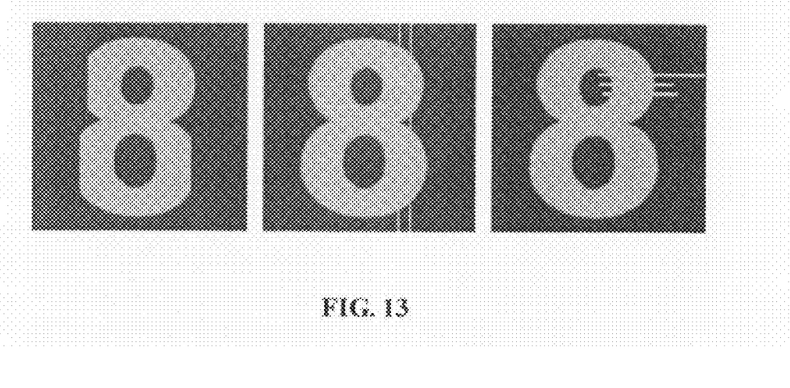
FIG. 13 is a view illustrating defective images which are used to observe a correlation distribution according to the defective location and defective thickness variation of a character.

FIG. 13 is a view illustrating defective images which are used to observe a correlation distribution according to the defective location and defective thickness variation of a character. Here, for the defective images, the number of defects was limited to fewer than three for each defective image, and 20 images, each of which was added by defects at other locations according to the number of defects, were additionally created for this experiment.

Figure 14A:
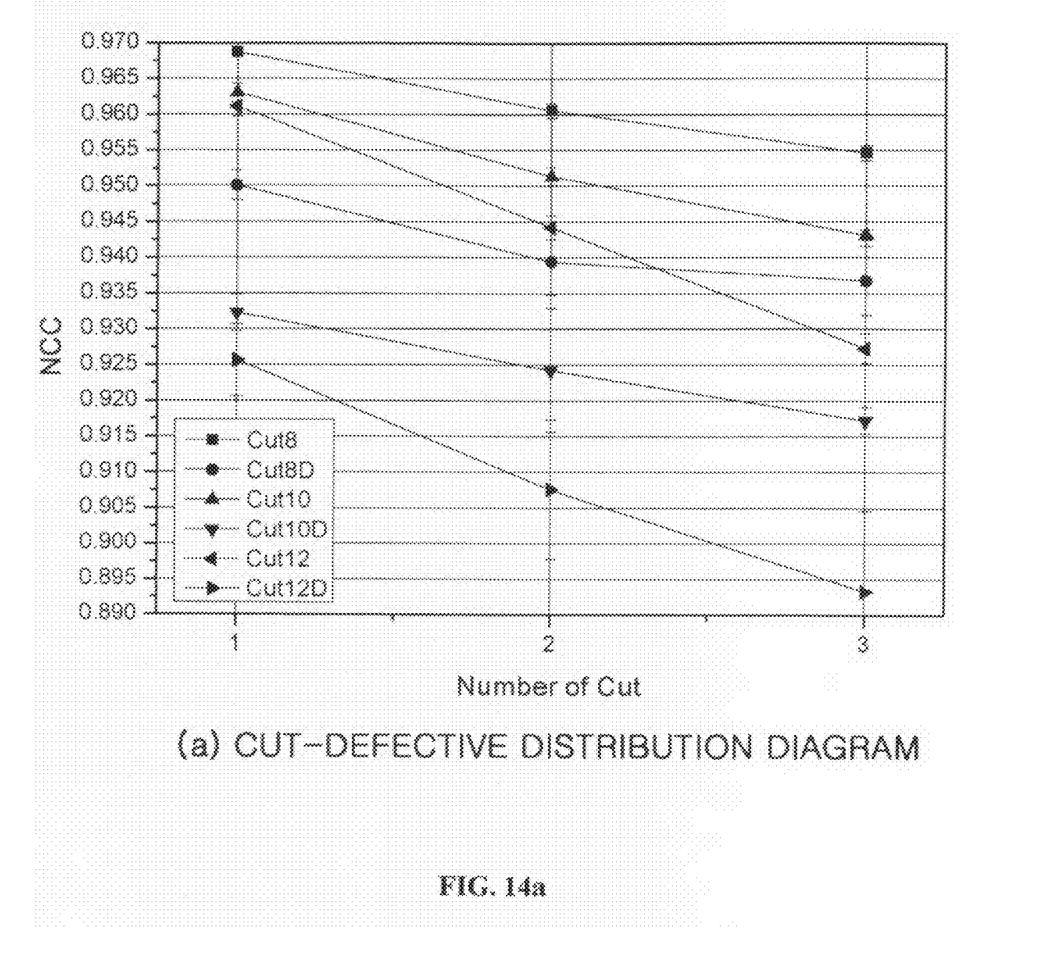
FIGS. 14a through 14c are graphs illustrating correlation distributions according to the defective location and defective thickness variation of a character.
Figure 14B:
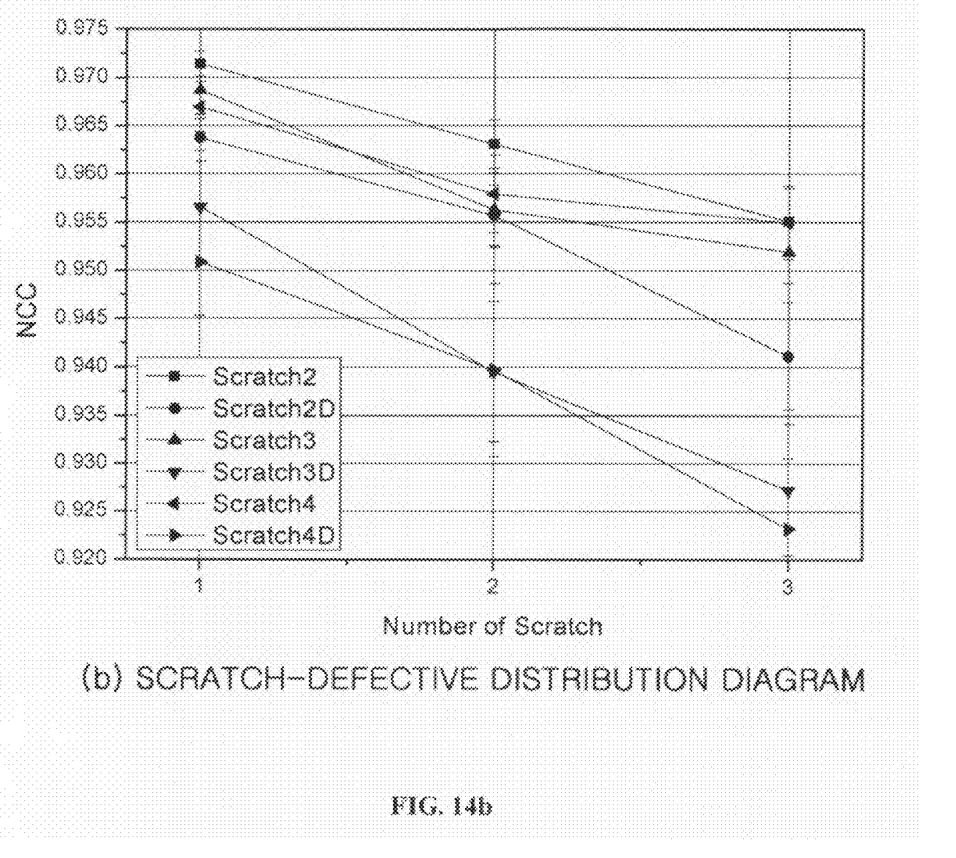
Figure 14C:
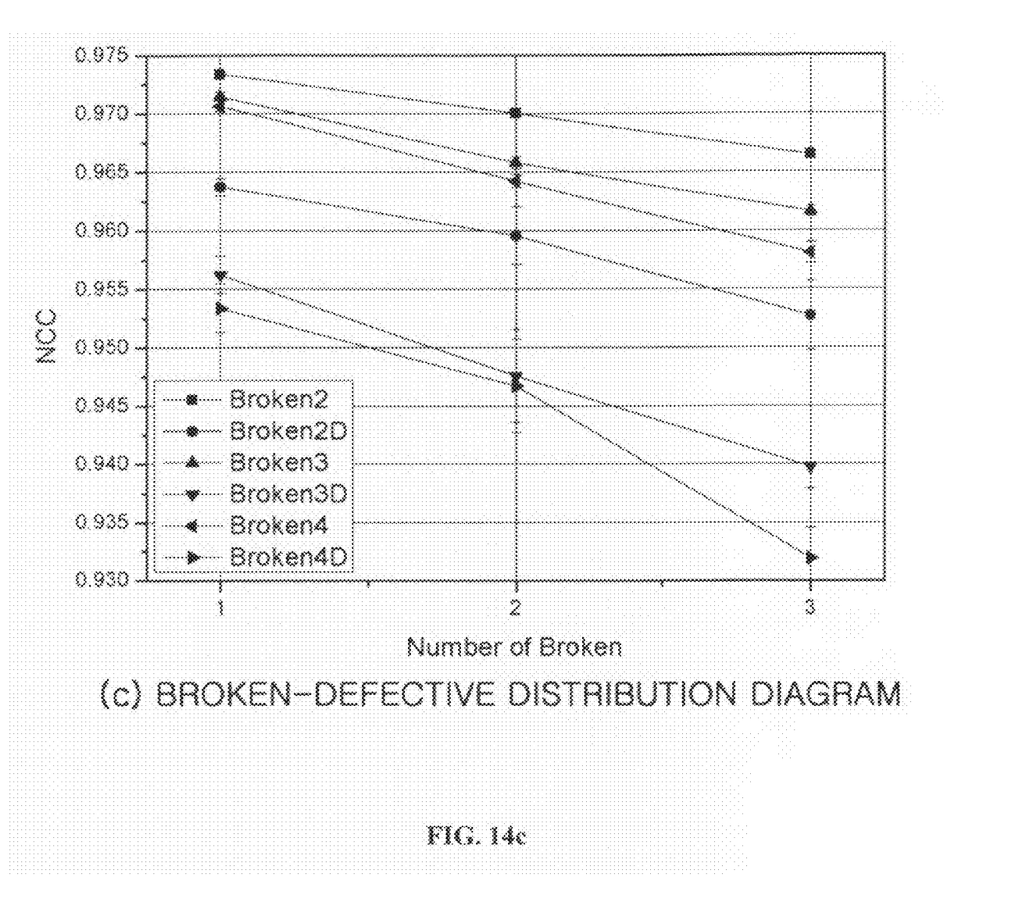

FIG. 14 is a graph illustrating correlation distributions according to the defective location and defective thickness variation of a character. Here, the item indicated by the ending identifier 'D' is result data to which a character partitioning method according to the present invention is applied, and the item without the ending identifier 'D' is result data to which a character partitioning method according to the present invention is not applied. Here, noise is fixed to SNR 22.

Referring to FIG. 14, it was confirmed that distinction between normal and defective remained unchanged despite the fact that such defective types and locations were changed in various ways.

Figure 15:
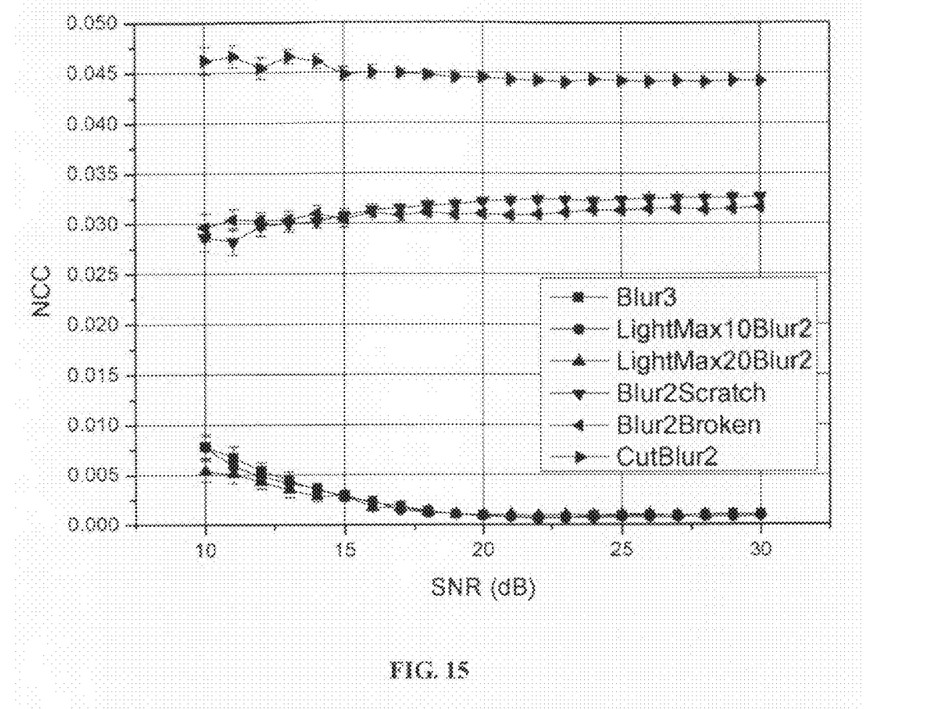
FIG. 15 is a graph illustrating a difference between maximum and minimum values when inspecting a normal image using a partitioning method according to the present invention, and a difference between maximum and minimum values when inspecting a defective image using a partitioning method according to the present invention.

(5) Defective Detection Using a Difference Between the Maximum and Minimum Values of the Correlation Coefficient Values for Each Partitioning Region:

Here, analysis was conducted on a difference between the maximum and minimum values when inspecting a normal image using a partitioning method according to the present invention, as well as a difference between the maximum and minimum values when inspecting a defective image using a partitioning method according to the present invention, and the result is shown in FIG. 15.

As illustrated in FIG. 15, it is seen that the difference between the maximum and minimum values of the correlation coefficient values for each partitioning region after partitioning a character plays a role of an index for defectiveness judgment.

That is, it can be seen that a difference between the maximum and minimum values of the correlation coefficient values is shown above a certain value (0.025) in case of defective marks (scratch, broken, and cut), but a difference between the maximum and minimum values of the correlation coefficient values is shown at a very low value below 0.010 in case of normal marks.

Figure 16:
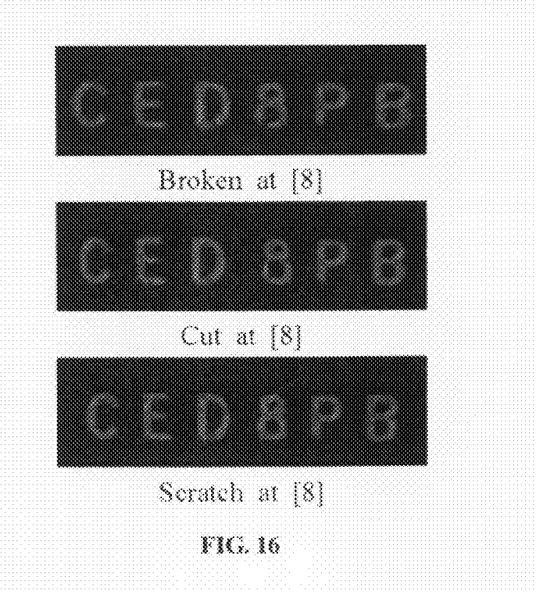
FIG. 16 is a view illustrating defective marks on an actual semiconductor package applied to an experiment according to the present invention.
Figure 17:
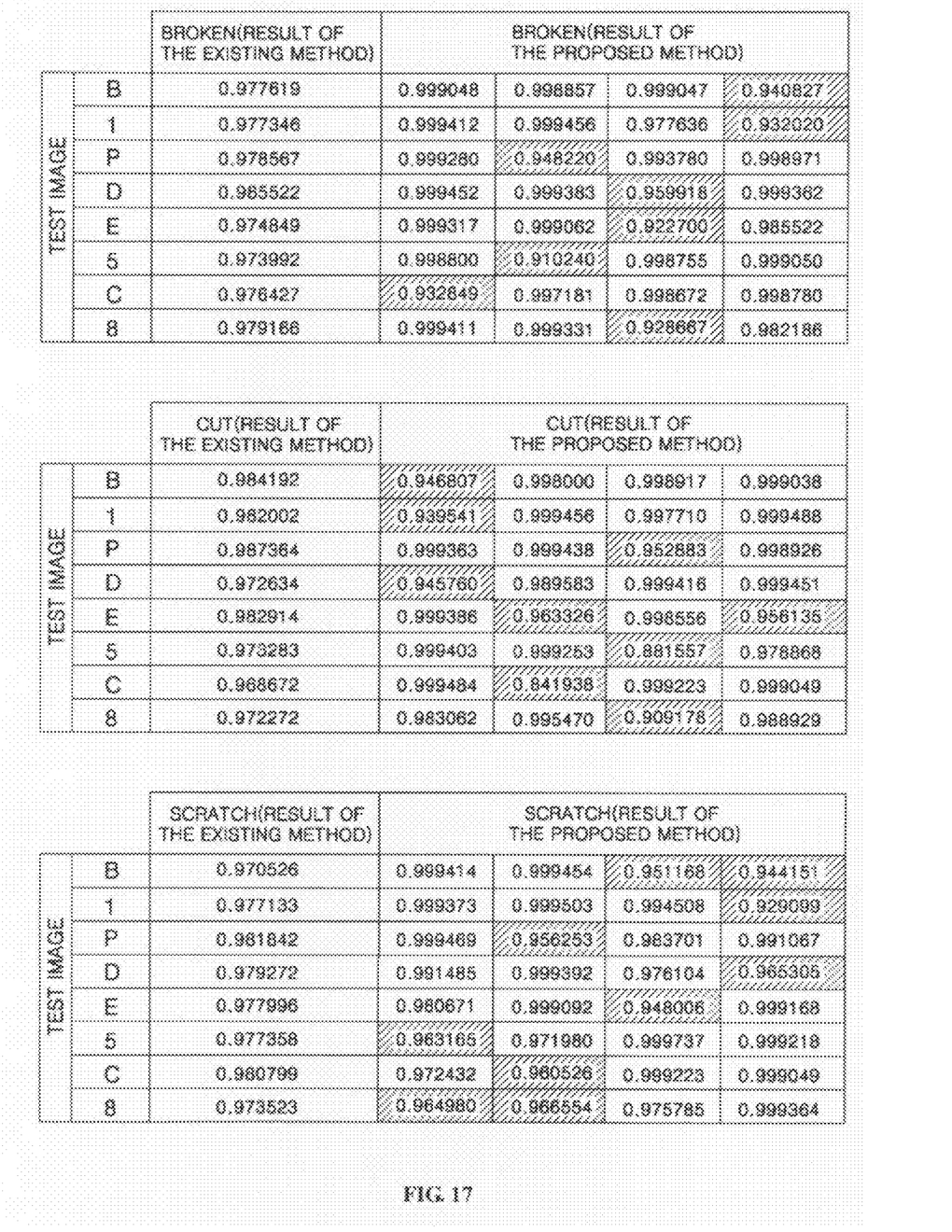
FIG. 17 is a view illustrating results for each of the defective types (broken, cut, and scratch) on an actual semiconductor package.

(6) Result in which Mark of an Actual Semiconductor Package was Applied:

Here, a result is shown in which the present invention is applied using the mark of an actual semiconductor package. FIG. 16 is a view illustrating defective marks on an actual semiconductor package applied to this experiment. FIG. 17 is a view illustrating results for each of the defective types (broken, cut, and scratch).

While the present invention has been described in detail with respect to a certain preferred embodiment of the invention, it will be understood by those skilled in the art that various changes and modifications may be made on the foregoing embodiment without departing from the scope of the invention. Therefore, the scope of the invention should not be restricted by the above described embodiment but only by the following claims and equivalents thereof.

We claim:

1. A mark partitioning inspection method, comprising the steps of:
   acquiring a reference image which is a reference for determining whether or not a mark has a defect;
   acquiring an inspection image for determining whether or not a mark has a defect;
   obtaining a correlation in a character unit for the reference image and the inspection image, and then comparing a correlation value with a first threshold value that has been previously set;
   partitioning the relevant character into a predetermined number of regions if the correlation value is greater than the first threshold value;
   obtaining a correlation between the reference image and the inspection image for each of the partitioned regions; and
   comparing a difference between maximum and minimum values of the correlation with a second threshold value that has been previously set to determine whether or not the inspection image is defective.

2. The mark partitioning inspection method according to claim 1 wherein the step of comparing the difference between the maximum and minimum values of the correlation with a second threshold value to determine whether or not the inspection image is defective determines that the inspection image is defective if the difference between the maximum and minimum values of the correlation is greater than the second threshold value.

3. The mark partitioning inspection method according to claim 1 wherein the step of comparing the difference between the maximum and minimum values of the correlation with a second threshold value to determine whether or not the inspection image is defective includes determining that the inspection image is normal if the difference between the maximum and minimum values of the correlation is smaller than the second threshold value.

4. The mark partitioning inspection method according to claim 1, further comprising determining that the inspection image is defective if the correlation value is smaller than the first threshold value.

5. The mark partitioning inspection method according to claim 4 wherein the step of comparing the difference between the maximum and minimum values of the correlation with a second threshold value to determine whether or not the inspection image is defective determines that the inspection image is defective if the difference between the maximum and minimum values of the correlation is greater than the second threshold value.

6. The mark partitioning inspection method according to claim 4 wherein the step of comparing the difference between the maximum and minimum values of the correlation with a second threshold value to determine whether or not the inspection image is defective includes determining that the inspection image is normal if the difference between the maximum and minimum values of the correlation is smaller than the second threshold value.

7. The mark partitioning inspection method according to claim 1, wherein the step of partitioning the relevant character into a predetermined number of regions includes partitioning of the relevant character into four regions.

8. The mark partitioning inspection method according to claim 7 wherein the step of comparing the difference between the maximum and minimum values of the correlation with a second threshold value to determine whether or not the inspection image is defective determines that the inspection image is defective if the difference between the maximum and minimum values of the correlation is greater than the second threshold value.

9. The mark partitioning inspection method according to claim 7 wherein the step of comparing the difference between the maximum and minimum values of the correlation with a second threshold value to determine whether or not the inspection image is defective includes determining that the inspection image is normal if the difference between the maximum and minimum values of the correlation is smaller than the second threshold value.

10. A mark partitioning inspection method, comprising the steps of:
acquiring a reference image which is a reference for determining whether or not a mark has a defect;
acquiring an inspection image for comparison with said reference image;
obtaining a first correlation value correlating a character unit in said reference image to a character unit in said inspection image;
comparing said first correlation value with a predetermined first threshold value;
partitioning the relevant character unit of said reference image and said inspection image into a plurality of regions if said first correlation value is greater than the first threshold value;
obtaining a subsequent correlation value as between each of the partitioned regions of the reference image and the inspection image; and
comparing the difference between the subsequent correlation value of the partitioned region having the maximum subsequent correlation value and the subsequent correlation value of the partitioned region having the minimum subsequent correlation value with a second threshold value that has been previously set to determine whether or not the inspection image is defective.

11. The mark partitioning inspection method according to claim 10 wherein the step of comparing the difference between the subsequent correlation values of the partitioned region having the maximum subsequent correlation value and the partitioned region having the minimum subsequent correlation value with a second threshold value that has been previously set to determine whether or not the inspection image is defective determines that the inspection image is defective if said difference is greater than the second threshold value.

12. The mark partitioning inspection method according to claim 10 wherein the step of comparing the difference between the subsequent correlation values of the partitioned region having the maximum subsequent correlation value and the partitioned region having the minimum subsequent correlation value with a second threshold value that has been previously set to determine whether or not the inspection image is defective includes determining that the inspection image is normal if said difference is smaller than the second threshold value.

13. The mark partitioning inspection method according to claim 10, further comprising determining that the inspection image is defective if the first correlation value is smaller than the first threshold value.

14. The mark partitioning inspection method according to claim 13 wherein the step of comparing the difference between the subsequent correlation values of the partitioned region having the maximum subsequent correlation value and the partitioned region having the minimum subsequent correlation value with a second threshold value that has been previously set to determine whether or not the inspection image is defective determines that the inspection image is defective if the difference between the maximum and minimum values of the correlation is greater than the second threshold value.

15. The mark partitioning inspection method according to claim 13 wherein the step of comparing the difference between the subsequent correlation values of the partitioned region having the maximum subsequent correlation value and the partitioned region having the minimum subsequent correlation value with a second threshold value that has been previously set to determine whether or not the inspection image is defective includes determining that the inspection image is normal if the difference between the maximum and minimum values of the correlation is smaller than the second threshold value.

16. The mark partitioning inspection method according to claim 10, wherein the step of partitioning the relevant character unit of said reference image and said inspection image into a plurality of regions includes partitioning of the relevant character unit of said reference image and said inspection image into four regions.

17. The mark partitioning inspection method according to claim 16 wherein the step of comparing the difference between the subsequent correlation values of the partitioned region having the maximum subsequent correlation value and the partitioned region having the minimum subsequent correlation value with a second threshold value that has been previously set to determine whether or not the inspection image is defective determines that the inspection image is defective if the difference between the maximum and minimum values of the correlation is greater than the second threshold value.

18. The mark partitioning inspection method according to claim 16 wherein the step of comparing the difference between the subsequent correlation values of the partitioned region having the maximum subsequent correlation value and the partitioned region having the minimum subsequent correlation value with a second threshold value that has been previously set to determine whether or not the inspection image is defective includes determining that the inspection image is normal if the difference between the maximum and minimum values of the correlation is smaller than the second threshold value.

\* \* \* \* \*